United States Patent [19]

Tsuda et al.

[11] Patent Number: 5,777,069
[45] Date of Patent: Jul. 7, 1998

US005777069A

[54] METHOD OF MANUFACTURING A TUBULAR EXTRUSION MOLDING PRODUCT COMPRISING A HIGH MOLECULAR WEIGHT POLYARYLENE SULFIDE

[75] Inventors: Takashi Tsuda; Hidenori Yamanaka; Osamu Komiyama, all of Ichihara, Japan

[73] Assignee: Tonen Chemical Corporation, Tokyo, Japan

[21] Appl. No.: 658,645

[22] Filed: Jun. 5, 1996

Related U.S. Application Data

[62] Division of Ser. No. 383,519, Feb. 3, 1995, abandoned.

[30] Foreign Application Priority Data

Feb. 7, 1994 [JP] Japan ................................ 6-033210
Feb. 8, 1994 [JP] Japan ................................ 6-34267

[51] Int. Cl.$^6$ ................................................. C08G 75/16
[52] U.S. Cl. ...................... 528/388; 428/35.7; 428/36.92
[58] Field of Search ........................ 528/388; 428/35.7, 428/36.92

[56] References Cited

U.S. PATENT DOCUMENTS

| | | | |
|---|---|---|---|
| 4,605,733 | 8/1986 | Senatore | 528/388 |
| 4,613,654 | 9/1986 | Katto et al. | 528/388 |
| 4,794,163 | 12/1988 | Inoue et al. | 528/388 |
| 4,794,164 | 12/1988 | Iwasaki et al. | 528/388 |
| 4,921,758 | 5/1990 | Tagaya et al. | 528/388 |
| 5,017,682 | 5/1991 | Köhler et al. | 528/388 |
| 5,037,952 | 8/1991 | Schmidt et al. | 528/388 |
| 5,093,468 | 3/1992 | Köhler et al. | 528/388 |
| 5,200,271 | 4/1993 | Kosaka | 428/457 |
| 5,200,500 | 4/1993 | Iizuka et al. | 528/388 |
| 5,264,259 | 11/1993 | Satoh et al. | 428/34.5 |
| 5,342,920 | 8/1994 | Imai et al. | 528/388 |

FOREIGN PATENT DOCUMENTS

| | | |
|---|---|---|
| 0 259 984 | 3/1988 | European Pat. Off. . |
| 0 272 903 | 6/1988 | European Pat. Off. . |
| 0 344 977 | 12/1989 | European Pat. Off. . |
| 45-3368 | 2/1970 | Japan . |
| 59-47590 | 3/1984 | Japan . |
| 59-85747 | 5/1984 | Japan . |
| 59-145131 | 8/1984 | Japan . |
| 61-7332 | 1/1986 | Japan . |
| 62-90216 | 4/1987 | Japan . |
| 2-255162 | 11/1991 | Japan . |
| 2-222196 | 8/1993 | Japan . |

OTHER PUBLICATIONS

Derwent English Abstract of Japanese Patent Publication No. 3368/1970.
Derwent English Abstract of Japanese Patent Laid–Open No. 47590/1984.
Derwent English Abstract of Japanese Patent Laid–Open No. 85747/1984.
Derwent English Abstract of Japanese Patent Laid–Open No. 145131/1984.
Derwent English Abstract of Japanese Patent Laid–Open No. 90216/1987.
Derwent English Abstract of Japanese Patent Laid–Open No. 255162/1991.
Derwent English Abstract of Japanese Patent Laid–Open No. 7332/1986.
Derwent English Abstract of Japanese Patent Laid–Open No. 222196/1993.
"Rheological Measurements", *Concise Encyclopedia of Polymer Science and Engineering,* published by John Wiley & Sons, pp. 994–996 (1990).

*Primary Examiner*—Charles Nold
*Attorney, Agent, or Firm*—Spencer & Frank

[57] ABSTRACT

A tubular extrusion molding product comprising a high molecular weight polyarylene sulfide having a melt viscosity of from 3,100 poise to 60,000 poise produced by reacting an alkali metal sulfide and a dihaloaromtic compound in the presence of an organic amide solvent, cooling a gaseous phase part in the reaction zone during the reaction thereby condensating at least a part of the gaseous phase and refluxing the resultant condensate to a liquid phase in the reaction zone. A tubular extrusion molding product having further improved impact resistance can be provided by copolymerizing from 0.2 mol % to 1 mol % of a polyhaloaromatic compound to the alkali metal sulfide. A tubular extrusion molding product of improved impact resistance is provided by further applying a heat treatment of the polyarylene sulfide intermediate product thereby increasing the melt viscosity.

7 Claims, No Drawings

5,777,069

1

METHOD OF MANUFACTURING A TUBULAR EXTRUSION MOLDING PRODUCT COMPRISING A HIGH MOLECULAR WEIGHT POLYARYLENE SULFIDE

CROSS-REFERENCE TO RELATED APPLICATION

The present application a division of application Ser. No. 08/383,519 filed Feb. 3, 1995 abandoned.

BACKGROUND OF THE INVENTION

1. Field of the Invention

The present invention concerns a tubular extrusion molding product comprising a high molecular weight polyarylene sulfide, and a method of manufacturing the tubular extrusion molding product.

2. Description of the Related Art

Polyarylene sulfide (hereinafter sometimes simply referred to as PAS) has excellent resistance to, for example, acids, alkalis or various kinds of organic solvents. Accordingly, it is expected that PAS is suitable, particularly, to application uses put under high temperature and corrosive circumstance, for example, application uses as pipelines for medical use, foodstuffs and chemical plants, hot water pipelines, steam pipelines, heat exchangers or various types of tubes.

Japanese Patent Publication NO. 3368/1970 describes a process for producing PAS by reacting an alkali metal sulfide and a dihaloaromatic compound in an organic amide solvent. However, high molecular weight PAS can not be produced by this process.

Accordingly, low molecular weight PAS described above was crosslinked by thermal oxidation to produce high molecular weight PAS. However, such a crosslinked PAS was insufficient, particularly, in mechanical strength such as impact resistance and elongation at break under tension. Further, since it has a large crystallizing rate and rapidly hardened during extrusion molding, it also involves a problem in view of fabrication such as difficulty in sizing to a tubular molding product.

A method of manufacturing a tubular molding product of excellent mechanical strength by compositing PAS with other material has been proposed. For example, Japanese Patent Laid-Open No. 47590/1984 discloses a method of manufacturing a composite resin pipe by using a pipe made of polyphenylene sulfide (hereinafter sometimes referred to simply as PPS) as a core material and coating the outer side thereof with a fiber reinforced thermosetting resin, Japanese Patent Laid-Open No. 85747/1984 discloses a method of manufacturing a composite pipe by inserting a pipe made of PPS to an inner surface of a metal pipe and bringing it into close contact therewith, or Japanese Patent Laid-Open No. 145131/1984 discloses a method of coating a thermoplastic resin other than PPS, for example, rigid polyvinyl chloride, polypropylene or nylon to the outside of PPS. However, such compositing methods require a number of production steps to increase the production cost and, accordingly, result in economic disadvantages.

A method of manufacturing PAS which can be used alone to the above-mentioned application use has been proposed. Japanese Patent Laid-Open No. 90216/1987 and Japanese Patent Laid-Open No. 255162/1991 describe a method of manufacturing tubular extrusion molding product by using PAS having a predetermined physical property. PAS used in

2 this method is produced by the process as described in Japanese Patent Laid-Open No. 7332/1986. Namely, in a process for producing PAS by reacting an alkali metal sulfide and dihaloaromatic compound in an organic amide solvent, reaction is conducted at a first stage in the presence of 0.5 mol to 2.4 mol of water per one mol of the alkali metal sulfide at a temperature of 180° C. to 235° C. to convert the dihaloaromatic compound at a rate from 50 mol % to 98 mol % and the reaction is continued further in the succeeding second stage by adding water in the presence of 2.5 mol to 7.0 mol of water at a temperature of 245° C. to 290° C.

In this process, water has to be added in the course of reaction. This can not but be done by once lowering the temperature after the first stage to attain and then adding water after correcting the water pressure, replacing reactor between the first stage and the second stage or charging water to a reactor at a high temperature and high pressure, which is disadvantageous in view of facility, economy and operation. Further, since water of not less than 2.5 mol is present per one mol of sodium sulfide and the temperature is raised to not lower than 245° C. in the second stage, the pressure increases as high as 20 kg/cm$^2$G or greater. Accordingly, the reactor has to actually endure a pressure of not less than 30 kg/cm$^2$G, and this is also disadvantageous in view of facility and economy.

In addition, the tubular extrusion molding product requires, in view of its shape, a strength against external impact shock and requires high elongation at break since it must be extrusion molded easily. However, no tubular extrusion molding products comprising a polvarylene sulfide capable of satisfying such performances have yet been disclosed.

SUMMARY OF THE INVENTION

It is an object of the present invention to provide a tubular molding product comprising an inexpensive high molecular weight polyarylene sulfide by itself, mechanical strength such as impact shock resistance, as well as a manufacturing method thereof.

Another object of the present invention is to provide a tubular extrusion molding product essentially comprising a high molecular weight polyarylene sulfide and having excellent mechanical strength such as impact shock resistance and improved workability.

The present inventors have made earnest studies in order to overcome the foregoing various drawbacks in the prior art and obtain a tubular extrusion molding product of excellent mechanical strength. As a result, it has been found that a high molecular weight PAS obtained by reacting an alkali metal sulfide and a dihaloaromatic compound in an organic amide solvent, cooling a gas phase portion of a reaction zone during the reaction, and refluxing the resultant condensation product to a liquid phase portion in the reaction zone has a melt viscosity within a predetermined range, and the tubular extrusion molding product comprising the high molecular weight PAS has excellent impact shock resistance that can not be provided in the prior art and also remarkably improved workability upon extrusion molding. The present invention has been accomplished based on such findings.

That is, in accordance with the present invention, there is provided a tubular extrusion molding product comprising a high molecular weight polyarylene sulfide obtained by reacting an alkali metal sulfide and a dihaloaromatic compound in the presence of an organic amide type solvent in a reaction zone provided with cooling means, cooling a gaseous phase part in a reaction zone during the reaction, condensating at least a part of the gaseous phase, and refluxing the resultant condensation product to a liquid phase in the reaction zone and having a melt-viscosity from 3100 poise to 60,000 poise.

Further, the present invention provides, in a preferred embodiment, a tubular extrusion molding product comprising the following high molecular weight polyarylene sulfide.

That is, there is provided a tubular extrusion molding product comprising a high molecular weight polyarylene sulfide having a melt-viscosity of 3,100 poise to 60,000 poise and providing excellent moldability, by incorporating a polyhaloaromatic compound together by an amount within a predetermined range upon reacting the alkali metal sulfide and the dihaloaromatic compound in the presence of the organic amide solvent.

Further, there is provided a tubular extrusion molding product comprising a high molecular weight polyarylene sulfide improved with impact shock resistance prepared by applying a heat treatment in a gaseous phase oxidative atmosphere to a polyarylene sulfide having a relatively low molecular weight (hereinafter sometime simply referred to as PAS(A)), obtained by reacting an alkali metal sulfide and a dihaloaromatic compound in the presence of an organic amide solvent, cooling a gaseous phase part in a reaction zone during the reaction, condensating at least a part of the gaseous phase, and refluxing the resultant condensation product to a liquid phase in the reaction zone.

Further, there is provided a tubular extrusion molding product comprising a high molecular weight polyarylene sulfide with a reduced inorganic ash content obtained by reacting an alkali metal sulfide and a dihaloaromatic compound in the presence of an organic amide solvent, cooling a gaseous phase part in a reaction zone during the reaction, condensating at least a part of the gaseous phase and refluxing the resultant condensation product to a liquid phase and bringing the reaction product into contact with an acid.

DETAILED DESCRIPTION OF THE INVENTION

As a process for producing PAS according to the present invention by cooling a gaseous phase part in a reaction zone thereby condensating at least a part of the gaseous phase in the reaction zone and refluxing the resultant condensate to a liquid phase, a process as defined in Japanese Patent Laid-Open No. 222196/1993 can be used.

The refluxed liquid has a higher water content, as compared with a liquid phase bulk, due to the difference of the vapor pressure between water and an amide solvent. The refluxed liquid having high water content forms a layer of high water content in an upper portion of a reaction solution. As a result, a great amount of residual alkali metal sulfide (for example, $Na_2S$), alkali metal halide (for example, NaCl) and oligomers are contained in this layer. In a conventional method, in which the resultant PAS, starting materials such as $Na_2S$ and by-products are mixed homogeneously at a high temperature of not lower than 230° C., not only high molecular weight PAS can not be obtained but also once formed PAS causes depolymerization and by-production of thiophenol is observed. However it is considered in the present invention that such disadvantageous phenomena can be avoided by positive cooling the gaseous phase part in the reaction zone and returning the water enriched reflux liquid in great quantities to an upper portion of the liquid phase, reaction inhibitive factors can indeed be efficiently removed to obtain high molecular weight PAS. However, the advantage of the present invention is attained not merely by the effect due to the phenomena as described above, but high molecular weight PAS can be obtained by various effects caused by cooling the gaseous phase part.

The present invention does not require the addition of water in the course of the reaction as in the conventional method, but addition of water is not quite excluded. However, several merits of the present invention will be lost by water adding operation. Therefore, the entire water content in the polymerizing reaction system is preferably kept constant throughout the reaction.

The gaseous phase part in the reaction zone can be cooled either externally or internally and can be conducted by cooling means known by itself. For instance, there may be considered to use a method of flowing a cooling medium to internal coils disposed to an upper portion in a reaction vessel, a method of flowing a coolant through external coils or jackets disposed around an upper portion at the outside of the reactor, a method of using a reflux condenser disposed to an upper portion of the reaction vessel or a method of spraying water or blowing gas (air, nitrogen or the like) to an upper portion at the outside of the reactor and any of them may be used so long as it results in an effect of increasing the refluxing amount in the vessel. If the external temperature is relatively low (for instance, at normal temperature), adequate cooling can be conducted by merely detaching an existent temperature keeping material provided to an upper portion of the reactor. In a case of external cooling, a condensated water/amide solvent mixture on a wall surface of the reactor enters along the vessel wall into the liquid phase. Accordingly, the water-enriched mixture stays in the upper portion of the liquid phase and keeps the water content there to a relatively high level. In a case of the internal cooling, a mixture condensated on the cooling surface enters similarly into the liquid phase along the surface of the cooling device or the wall of the reactor.

On the other hand, the temperature of the liquid phase bulk is kept at a predetermined constant temperature or controlled in accordance with a predetermined temperature profile. If it is kept at a constant temperature, it is preferable to conduct reaction at a temperature from 230° C. to 275° C. for 0.1 to 20 hours. More preferably, the reaction is conducted at a temperature for 240° C. to 265° C. for 1 to 6 hours. For obtaining PAS of higher molecular weight, it is preferred to use a reaction temperature profile of two or more stages. In the case of conducting the two stage operation, the first stage is conducted preferably at a temperature from 195° C. to 240° C. If the temperature is lower, a reaction rate is too late to be practical. If the temperature is higher than 240° C., the reaction rate is too fast to obtain PAS of a sufficiently high molecular weight, as well as the rate of side reaction increased remarkably. The first stage is terminated, preferably, at an instance when the residual rate of the dihaloaromatic compound in the polymerizing reaction system is within a range from 1 mol % to 40 mol % and the molecular weight is within a range from 3,000 to 20,000. More preferably, the residual ratio of the dihaloaromatic compound in the polymerizing reaction system is within a range from 2 mol % to 15 mol % and the molecular weight range is within a range from 5,000 to 15,000. If the residual ratio exceeds 40 mol %, side reaction such as depolymerization is liable to occur in the reaction at the second stage. On the other hand, if it is less than 1 mol %, it is difficult to obtain high molecular weight PAS finally. The temperature is subsequently elevated and the reaction at the final stage is preferably conducted at a reaction temperature within a range from 240° C. to 270° C., for 1 to 10 hours. If the temperature is lower, sufficiently high molecular weight PAS can not be obtained. On the other hand, at a temperature above 270° C., side reaction such as depolymerization tends to occur making it difficult to stably obtain a high molecular weight product.

In an actual operation, water is at first removed or added as necessary such that the water content of the alkali metal sulfide in the amide solvent has a predetermined amount in an inert gas atmosphere. The water content is preferably from 0.5 mol to 2.5 mol and, particularly preferably, from 0.8 mol to 1.2 mol based on one mol of the alkali metal sulfide. If it exceeds 2.5 mol, the reaction rate is reduced, the amount of by-products such as phenol is increased in the liquid filtrate after completion of the reaction and the degree of polymerization is not increased as well. If it is less than 0.5 mol, the reaction rate is too fast to obtain a sufficiently high molecular weight product.

Cooling for the gaseous phase part during the reaction is desirably conducted from the start of the reaction in a case of the one stage reaction at a constant temperature and it has to be conducted at least in the course of temperature elevation to lower than 250° C. In a multi-stage reaction, cooling is desirably conducted already from the reaction at the first stage but it is preferred to conduct cooling at the latest in the course of the temperature elevation after the completion of the reaction at the first stage. For the extent of the cooling effect, a pressure in the reactor is usually a most suitable index. The absolute value for the pressure varies depending, for example, on the characteristic of the reactor, the state of stirring, water content in the system and a molar ratio between the dihaloaromatic compound and the alkali metal sulfide. However, if the pressure in the reactor is lowered as compared with a case of not conducting cooling under the same reaction condition, this means that the amount of the reflux liquid is increased and the temperature at the gas-liquid boundary of the reaction solution is lowered, and it is considered that the degree of the relative reduction shows the extent of separation between a layer of much water content and a layer of less water content. Then, the cooling is preferably conducted to such an extent that the internal pressure of the reaction vessel is lowered as compared with a case of not applying cooling. The degree of cooling can properly be set by those skilled in the art depending on the device used and in accordance with operation condition or the like.

The organic amide solvent used herein has been known for PAS polymerization and, for instance, N-methylpyrrolidone (NMP), N,N-dimethylformamide, N, N-dimethylacetoamide, N-methylcaprolactam, as well as a mixture thereof can be used, especially NMP is preferred. Any of the solvents has a vapor pressure lower than that of water.

The alkali metal sulfide is also known and it is, for example, lithium sulfide, sodium sulfide, potassium sulfide, rubidium sulfide, cesium sulfide and a mixture thereof. Hydration product and aqueous solution of them may also be used. In addition, hydrosulfide and hydration products corresponding to them respectively may also be used by neutralizing with corresponding hydrogen oxides. Inexpensive sodium sulfide is preferred.

The dihaloaromatic compound can be selected, for example, from those as described in Japanese Patent Publication No. 3368/1970 and p-dichlorobenzene is preferred. Further, a copolymer can be obtained by using one or more of a small amount (not more than 20 mol %) of diphenyl ether, diphenyl sulfone or biphenyl para-, meta- or ortho-dihalides. There can be mentioned, for example, m-dichlorobenzene, o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p-dichlorobiphenyl, m,p'-dichlorobiphenyl and m,m'-dichlorobiphenyl.

Further, other minor amount additives, mono-halides can be used together as a terminator and a modifier.

The thus obtained high molecular weight PAS is separated from by-products by way of a post processing method known to those skilled in the art.

The high molecular weight PAS for a tubular molding product produced as described above has a melt viscosity $V_6$ of from 3,100 poise to 60,000 poise. If the melt viscosity Is less than the lower limit of $V_6$ as described above, the mechanical strength such as impact shock resistance of the tubular extrusion molding product is reduced. On the other hand, the melt viscosity exceeding the upper limit of $V_6$ as described above is not preferred since it reduces the extrusion speed or the moldability upon extrusion molding due to lowering of the fluidity.

The melt Viscosity $V_6$ means viscosity (poise) measured after maintaining for 6 min at 320° C. under load of 20 kgf/cm$^2$ at L/D=10 by using a Flow Tester CFT-500C manufactured by Shimazu Seisakusho. In accordance with a preferred embodiment of the present invention, there is provided a tubular extrusion molding product comprising a high molecular weight polyarylene sulfide having a melt viscosity from 3,100 poise to 60,000 poise and having an improved mechanical strength such as impact shock resistance and moldability, by reacting an alkali metal sulfide and a dihaloaromatic compound in an organic amide solvent, in which a polyhaloaromatic compound within a predetermined range of amount is incorporated together with charged alkali metal sulfide.

Referring more specifically, a polyhaloaromatic compound in an amount from 0.2 mol % to 1.0 mol %, preferably, from 0.3 mol % to 0.6 mol % based on the charged alkali metal sulfide is added in a polymerizing reaction system. By restricting the addition amount within the above specified range, a tubular extrusion molding product having an excellent impact shock resistance can be manufactured. If the addition amount of the polyhaloaromatic compound is less than the lower limit as described above, the degree of the mechanical strength such as impact shock resistance of the tubular molding product show that the degree of improvement thereof is low. On the other hand, if the upper limit as described above is exceeded, it is not preferred since the extrusion characteristics such as extrusion speed or the moldability upon manufacture of a tubular molding product are deteriorated.

There is no particular restriction on the method of adding the polyhaloaromatic compound in the polymerizing reaction system. For example the polyhaloaromatic compound may be added together with the alkali metal sulfide and the dihaloaromatic compound at the same time, or the polyhaloaromatic compound is dissolved in the organic solvent, for example, N-methylpyrrolidone at an optional time in the course of the reaction and the solution may be charged under pressure into a reactor by a high pressure pump.

The polyhaloaromatic compound is a compound having three or more halogen substituents in one molecule and there can be mentioned, for example, 1,2,3-trichlorobenzene, 1,2,4-trichlorobenzene, 1,3,5-trichlorobenzene, 1,3-dichloro-5-bromobenzene, 2,4,6-trichlorotoluene, 1,2,3,5- tetrabromobenzene, hexachlorobenzene, 1,3,5-tri-chloro-2, 4,6-trimethylbenzene, 2,2',4,4'-tetrachlorobiphenyl, 2,2',6, 6'-tetrabromo-3,3,'5,5'-tetramethylbiphenyl, 1,2,3,4-tetrachloronaphthalene, 1,2,4-tribromo-6-methyl-naphthalene and a mixture of them, 1,2,4-trichlorobenzene and 1,3,5-trichlorobenzene being preferred.

The reaction condition and -he reaction form upon reacting the alkali metal sulfide, the dihaloaromatic compound and the polyhaloaromatic compound in the organic amide solvent may be identical with the reaction condition and the reaction form upon reacting the alkali metal sulfide and the dihaloaromatic compound described previously.

The high molecular weight PAS obtained by using the polyhaloaromatic compound has a melt viscosity $V_6$ of, preferably, 5,000 poise to 60,000 poise and, particularly preferably, 20,000 poise to 50,000 poise.

This invention will be described with other preferred embodiments of the present invention.

As described above, a polyarylene sulfide (PAS(A)) obtained by reacting an alkali metal sulfide, a dihaloaromatic compound and, if necessary, a polyhaloaromatic compound in an organic amide solvent, cooling a gaseous phase part in a reaction zone during the reaction thereby condensating at least a part of the gaseous phase and refluxing the condensate to the liquid phase is applied with heat treatment in a gaseous phase oxidative atmosphere. The heat treatment can be practiced by a known method. The temperature at which the heat treatment is applied is preferably from 100° C. of $V_6$ as described to 280° C. and, particularly preferably, 170° C. to 250° C. If the temperature is lower than 100° C., time required for heat treatment is increased. On the other hand, if it exceeds 280° C. heat stability of the processed PAS in a molten state is poor, which is not preferred. The time required for thermal oxidation varies depending on the heating temperature or desired melt viscosity of PAS, which is preferably from 0.5 to 25 hours and, particularly preferably, from 5 to 20 hours. If the processing time is less than 0.5 hours, no high molecular weight PAS can be obtained. If it exceeds 25 hours, occurrence of microgel in the processed PAS is increased, which is not preferred.

The heat treatment is practiced, preferably, in a gaseous phase oxidative atmosphere containing an oxygen containing gas, preferably, air, pure oxygen or a mixture thereof with an appropriate inert gas. As the inert gas, there can be mentioned, for example, steam, nitrogen, carbon dioxide or a mixture thereof. The concentration of oxygen in the oxygen containing gas is preferably from 0.5% to 50% by volume and particularly preferably, 10% to 25% by volume. If the concentration of oxygen exceeds 50% by volume, the amount of radicals generated is increased to remarkably increase the viscosity in a molten state and the color becomes dark, which is not preferred. On the other hand, if it is less than 0.5% by volume, the thermal oxidation rate is retarded, which is not preferred.

The device for applying the heat treatment of the present invention may be a batchwise or continuous type for which any known device can be used. For example, there can be mentioned a device for bringing PAS into contact with an oxygen containing gas in a tightly closed vessel provided with a stirrer, preferably, a fluidized bed type thermal oxidation device provided with a stirrer is used. By using the device, the temperature distribution in the bath can be reduced. As a result, thermal oxidation can be promoted and irregularity of the molecular weight can be prevented.

The high molecular weight PAS used for tubular extrusion molding product manufactured as described above has a melt viscosity $V_6$ preferably from 3,100 to 35,000 poise.

In a further preferred embodiment of the present invention, an acid treatment may be applied further to the polyarylene sulfide before the heat treatment in the gaseous phase oxidative atmosphere. The acid treatment is practiced at a temperature not higher than 100° C., preferably, from 40° C. to 80° C. If the temperature exceeds the upper limit, it is not preferred since the molecular weight of PAS after the acid treatment is lowered. On the contrary, if it is lower than 40° C., remaining inorganic salts are deposited to lower the fluidity of the slurry and hinder the process of the continuous treatment, which is not preferred. The concentration of an acid solution used for the acid treatment is preferably from 0.01% by weight to 5.0% by weight. Further, pH of the acid solution is preferably from 4.0 to 5.0 after the acid treatment. Using the concentration and the pH value described above are preferable since most of —SNa and —COON at terminals in PAS as the treated product can be converted into —SH and —COOH terminals and corrosion of plant facilities, etc. can be prevented. The time required for the acid treatment depends on the temperature of the acid treatment and the concentration of the acid solution. Preferably, it is not less than 5 min, particularly, not less than 10 mn. If it is less than 5 min, —SNa and —COONa terminals in PAS can not be converted sufficiently into —SH and —COOH terminals. For the acid treatment, there can be used, for example, acetic acid, formic acid, oxalic acid, phthalic acid, hydrochloric acid, phosphoric acid, sulfuric acid, sulfurous acid, nitric acid, boric acid and carbonic acid, acetic acid being particularly preferred. By the acid treatment, sodium as the impurity in PAS can be reduced. Accordingly, leaching of sodium and deterioration of electric insulation during use of the product can be suppressed.

Conventional additives can be blended in the tubular extrusion molding product. For instance, there can be blended in organic fillers such as silica, alumina, talc, mica, kaolin, clay, silica alumina, titanium oxide, calcium carbonate, calcium silicate, calcium phosphate, calcium sulfate, magnesium carbonate, magnesium oxide, magnesium phosphate, silicon nitride, glass, hydrotalcite and zirconium oxide in granular, powdery or scaly, or glass fibers, potassium titanate fibers, carbon fibers and mica ceramic fibers in a fibrous. The inorganic fillers can be used each alone or as a combination of two or more of them. Further, the inorganic fillers may be treated with a silane coupling agent or titanate coupling agent. The blending ratio of the filler is preferably not more than 30% by weight in the tubular molding product in view of the melt-workability or the like.

Further, as necessary, additives such as antioxidant, thermal stabilizer, lubricant, releasing agent and colorant can be blended.

There is no particular restriction for the method of mixing each of the ingredients. A method employed generally, for example, a method of mixing each of the ingredients by a mixer such as a Henschel mixer can be used.

The tubular extrusion molding product is generally manufactured by melting a polymer under heating, extruding from a dice having an annular opening, sizing to a predetermined size, drawing and then cutting it. The high molecular weight PAS according to the present invention can be formed to a tubular extrusion molding product of good moldability and having excellent impact shock resistance by applying such a molding method.

The tubular extrusion molding product can be used for application uses such as pipelines for medical use, chemical plant and foodstuffs, hot water pipelines, heat exchangers and steam pipelines. In addition, it can be used, for example, pipelines for electric wires requiring flame retardancy or pipes or tubes used in an atmosphere, for example, of strong acid, strong alkali and organic solvent.

The present invention will be explained more specifically referring to examples but the invention is not limited only to such examples.

EXAMPLE

In the examples, each of melt viscosities $V_6$ and $V_{30}$ means a viscosity (poise) measured by using a Flow Tester CFT-500C manufactured by Shimazu Seisakusho after being kept at 320° C., under a load of 20 kgf/cm² and at L/D=10 for 6 min or 30 min, respectively.

The reaction rate of p-dichlorobenzene (hereinafter sometimes simply referred to as p-DCB) was calculated from the result of gas chromatographic measurement. The reaction rate of p-DCB was determined here by the following equation:

p-DCB reaction rate (%)=(1-residual p-DCB weight/charged p-DCB weight)×100

The impact shock resistance is a value measured for Izod impact strength in accordance with ASTM D256. The quantity of sodium in PAS was determined using an atomic absorption spectrophotometer (AA 660 manufactured by Shimazu Seisakusho) after a test piece washed by using sulfuric acid and then it was solved to hydrochloric acid.

POLYMERIZATION EXAMPLE 1

To a 150 liter autoclave, were charged 19.00 kg of flaky sodium sulfide (60.1 wt % $Na_2S$) and 45.0 kg of N-methyl-2-pyrrolidone (hereinafter sometimes simply referred to as NMP). The temperature was elevated to 209° C. in a flow of nitrogen under stirring to distill off 4.91 kg of water. Subsequently, the autoclave was sealed and cooled to 180° C., in which 21.940 kg of p-DCB, 74.3 g of 1,2,4-trichlorobenzene (hereinafter sometimes simply referred to as 1,2,4-TCB) (about 0.28 mol % to sodium sulfide) and 18.0 kg of NMP were charged. At a liquid temperature of 150° C., temperature elevation was started by pressurizing to 1 kg/cm²G by using a nitrogen gas. The upper portion of the autoclave was, cooled by spraying water while stirring for 5 hours at a liquid temperature of 220° C. Subsequently, the temperature was elevated and stirring was conducted for 5 hours at a liquid temperature of 260° C. and then the temperature was lowered and cooling for the upper portion of the autoclave was stopped. The temperature was kept constant so that the liquid temperature was not lowered during cooling for the upper portion of the autoclave. The maximum pressure during the reaction was 8.60 kg/cm²G.

The slurry obtained was filtered and washed with warm water repeatedly in a conventional method and then dried at 120° C. for about 8 hours to obtain a white powdery product. The melt viscosity $V_6$ of the resultant PPS (p-1) was 30,300 poise.

p-DCB reaction rate was 99.2%.

POLYMERIZATION EXAMPLE 2

The procedures were identical with those in Polymerization Example 1 except for increasing the addition amount of 1,2,4-TCB to 158.9 g (0.6 mol % to sodium sulfide).

The melt viscosity $V_6$ of the resultant PPS (P-2) was 49,300 poise.

p-DCB reaction rate was 98.7%.

POLYMERIZATION EXAMPLE 3

The procedures were identical with those in Polymerization Example 1 except for adding 1,2,4-TCB after stirring sodium sulfide and p-DCB at a liquid temperature of 220° C. for 5 hours. The addition was conducted by previously dissolving 74.3 g of 1,2,4-TCB to 500 g of NMP, charging the solution into a reactor by a small sized high pressure pump and then further charging 500 g of NMP.

The melt viscosity $V_6$ of the resultant PPS (P-3) was 28,400 poise.

p-DCB reaction rate was 99.3%.

POLYMERIZATION EXAMPLE 4

The procedures were identical with those in Polymerization Example 1 except for using 1,3,5-trichlorobenzene instead of 1,2,4-TCB.

The melt viscosity $V_6$ of the resultant PPS (P-4) was 45,100 poise.

p-DCB reaction rate was 99.2%.

COMPARISON POLYMERIZATION EXAMPLE 1

The procedures were the same as those in Polymerization Example 1 except for not adding 1,2,4-TCB.

The melt viscosity $V_6$ of the resultant PPS (P-C1) was 1,400 poise.

p-DCB reaction rate was 99.1%.

COMPARISON POLYMERIZATION EXAMPLE 2

The procedures were identical with those in Polymerization Example 1 except for decreasing the addition amount of 1,2,4-TCB to 31.8 g (about 0.12 mol % to sodium sulfide).

The melt viscosity $V_6$ of the resultant PPS (P-C2) was 2,980 poise.

p-DCB reaction rate was 99.4%.

COMPARISON POLYMERIZATION EXAMPLE 3

The procedures were identical with those in polymerization Example 1 except for decreasing the addition amount of 1,2,4-TCB to 278.1 g (about 1.05 mol % to sodium sulfide).

The resultant PPS (P-C3) contained a gelling product. The melt viscosity $V_6$ of PPS after removing the gelling product was 89,000 poise and the viscosity increasing ratio during melting could not be measured because of the progress of gelation.

p-DCB reaction rate was 99.6%.

COMPARISON POLYMERIZATION EXAMPLE 4

The same procedures as in polymerization Example 1 was repeated with the exception that water was not sprinkled to the upper part of the autoclave and that the addition amount of 1,2,4-TCB was increased to 423.8 g (1.60 mol % to sodium sulfide). The maximum pressure during reaction was 10.2 kg/cm²G.

The resultant PPS (P-C4) contained a gelling product. The melt viscosity $V_6$ of PPS after removing the gelling product was 45,400 poise.

p-DCB reaction rate was 98.3%.

EXAMPLES 1–4 AND COMPARISON EXAMPLES 1–4

PAS is obtained as described above were melt kneaded by using a twin screw extruder at a temperature of 320° C. to prepare pellets. Further, the resultant pellets were supplied to a 35 mmφ small sized single screw extruder having a cylinder temperature set to 320° C., then passed through a sizing device and cooled to manufacture pipes each of 20.0 mm inner diameter and 2.8 mm wall thickness continuously at a rate of 0.8 m per min.

Rectangular test pieces each sized 60×12.7×3 mm were cut out from the pipe and measured for Izod impact strength.

The results are shown in Table 1.

POLYMERIZATION EXAMPLE 5

To a 4 m³ autoclave, were charged 523.1 kg of flaky sodium sulfide (60.8 wt % $Na_2S$) and 1200 kg of NMP. The temperature was elevated to 204° C. in a flow of nitrogen under stirring to distill off 126.3 kg of water. Subsequently, the autoclave was sealed and cooled to 180° C. under load of 20 kgf/cm² at L/D=10, in which 597.2 kg of p-DCB and 400 kg of NMP were charged. After pressuring it to 1 kg/cm²G with nitrogen gas at a liquid temperature of 150° C., temperature was started to raise. Coolants at 20° C. were supplied for cooling through coils wound around the outside of an upper portion of the autoclave while stirring was continued at a liquid temperature of 220° C. for 3 hours. Then, the temperature was raised and stirring was conducted at a liquid temperature of 260° C. for 3 hours. sequently the temperature was lowered and, at the same time, the cooling for the upper portion of the autoclave was stopped. The temperature was kept constant so as not to lower the liquid temperature during cooling for the upper portion of the autoclave. The maximum pressure during the reaction was 8.81 kg/cm²G.

The slurry obtained was filtered and washed with warm water repeatedly in conventional method and then dried at 130° C. for about 4 hours to obtain a white powdery intermediate product. The melt viscosity $V_6$ of the resultant PAS (P-05) was 960 poise.

Then, the intermediate product (PAS(A)) was charged into a 5 m³ thermal oxidation processing device and stirred at a bath temperature of 220° C. for 8 hours. Subsequently, it was cooled to obtain a product. The melt viscosity $V_6$ of the resultant product (P-5) was 3,190 poise.

POLYMERIZATION EXAMPLE 6

The same procedures as in polymerization example 5 was repeated with exception that the thermal oxidation processing time was changed to 15 hours. The melt viscosity $V_6$ of the resultant product (P-6) was 7,340 poise.

POLYMERIZATION EXAMPLE 7

The same procedures as in polymerization example 1 was repeated with exception that the thermal oxidation processing time was changed to 24 hours. The melt viscosity $V_6$ of the resultant product (P-7) was 33,200 poise.

POLYMERIZATION EXAMPLE 8

To a 4 m³ autoclave, were charged 524.8 kg of flaky sodium sulfide (60.6 wt % $Na_2S$) and 1200 kg of NMP. The temperature was elevated to 204° C. in a flow of nitrogen under stirring to distill off 125.4 kg of water. Subsequently, the autoclave was tightly closed and cooled to 180° C., to which were charged 596.0 kg of p-DCB and 400 kg of NMP. After pressuring it to 1 kg/cm²G with nitrogen gas at a liquid temperature of 150° C., temperature was started to raise. When the liquid temperature reached 220° C., water was sprayed by a water spraying device attached to the outside to an upper portion of the autoclave to cool the upper portion of the autoclave. Subsequently, the liquid temperature was continued to elevate to 260° C. and then stirring was conducted at that temperature for 2 hours. Then, the temperature was lowered and the cooling for the upper portion of the autoclave was stopped. The temperature was kept constant so as not to lower the liquid temperature during cooling for the upper portion of the autoclave. The maximum pressure during the reaction was 8.74 kg/cm²G.

The slurry detained was filtered and washed with warm water each twice in a conventional method. 2,400 kg of water and 4.0 kg of acetic acid were added to the resultant resin product (containing about 50% by weight of water) and stirred at 50° C. for 30 min. pH value after stirring was 4.6. Procedures of separating the resin by filtration adding 2,400 kg of water and stirring them for 30 min. followed by filtration were repeated for 5 times.

The product was dried in a hot blow circulating drier at 130° C. for about 4 hours to obtain a white powdery intermediate product. The melt viscosity $V_6$ of the resultant PAS (P-08) was 820 poise.

Then, the above-mentioned intermediate product (PAS (A)) was charged in a 5 m³ thermal oxidation treating device and stirred at a bath temperature of 220° C. for 9.5 hours. Subsequently, the content was cooled to obtain a product. The melt viscosity $V_6$ of the resultant product (P-8) was 3,280 poise.

POLYMERIZATION EXAMPLE 9

The same procedures as in polymerization example 5 was repeated with the thermal oxidation processing time were changed to 17 hours. The melt viscosity $V_6$ of the resultant product (P-9)was 7,490 poise.

COMPARISON POLYMERIZATION EXAMPLES 5

To a 4 m³ autoclave, were charged 523.1 kg of flaky sodium sulfide (60.8 wt % $Na_2S$) and 1200 kg of NMP. The temperature was elevated to 204° C. in a flow of nitrogen under stirring to distill off 124.3 kg of water. Subsequently, the autoclave was sealed and cooled to 180° C., in which 614.4 kg of p-DCB and 400 kg of NMP were charged. After pressuring it to 1 kg/cm²G with nitrogen gas at a liquid temperature of 150° C., temperature was started to raise. When the liquid temperature reached 255° C., temperature elevation was stopped and stirring was conducted for 2 hours. Then, the temperature was lowered to 200° C. for 1.5 hours. The maximum pressure during the reaction was 10.31 kg/cm²G.

The slurry obtained was filtered and washed with warm water repeatedly in a conventional method, in a hot blow circulating drier dried at 130° C. for about 4 hours, to obtain a white powdery intermediate product. The melt viscosity $V_6$ of the resultant PAS (P-C05) was 315 poise.

Then, the above-mentioned intermediate product (PAS (A)) was charged in a 5 m³ thermal oxidation treating device and stirred at a bath temperature of 220° C. for 25 hours Subsequently, the content was cooled to obtain a product The melt viscosity $V_6$ of the resultant product (P-C5) was 2,890 poise.

EXAMPLES 5–9 AND COMPARISON EXAMPLES 5–8

PASs obtained as described above were melt kneaded by using a twin screw extruder at a temperature of 320° C. to prepare pellets. Further, the resultant pellets were supplied to a 45 mmφ single screw extruder having a cylinder temperature set to 320° C., then passed through a sizing device and cooled to manufacture pipes each of 25.0 mm inner diameter and 3.0 mm wall thickness continuously at a rate of 0.8 m per min.

Rectangular test pieces each sized 60×12.7×3 mm were cut out from the pieces and measured for Izod impact strength and amount of Na.

The results are shown in Table 2.

In example 1, 1,2,4-TCB as the polyhaloaroamtic compound was added within the range of the present invention. The pipe had satisfactory impact resistance or strength. In example 2, the addition amount of the polyhaloaromatic compound was increased as compared with Example 1. It was found that as the addition amount of the polyhaloaromatic compound was increased within a range of the present invention, the impact resistance of the pipe was increased. In example 3, the polyhaloaroamtic compound was added in the middle of the reaction under the same conditions as those in example 1. The pipe had good impact resistance or strength. In example 4, 1,2,4-TCB was replaced with 1,3,5-TCB under the same conditions as those in example 1. The pipe had impact resistance irrespective of the kind of the polyhaloaromatic compound.

On the other hand, in Comparison Examples 1, 2 and 3, the addition amount of the polyhaloaromatic compound was out of the range of the present invention under the same conditions as those in example 1. At an addition amount less than lower limit for the range of the present invention (Comparison Examples 1 and 2), the melt viscosity was remarkably low. On the other hand, if it exceeded the upper limit (Comparison Example 3), the melt viscosity was remarkably increased. Pipes could not be molded in both of the cases. In Comparison Example 4, the upper portion of the reactor was not cooled and the amount of 1,2,4-TCB was increased to greater than the upper limit in the present invention. The impact resistance of the pipe was low.

In Example 5, the impact resistance of the pipe was more satisfactory as compared with Comparison Example 5 in which no thermal oxidation treatment was applied. In Examples 6, 7, the time for thermal oxidation treatment was increased relative to Example 5 and the melt viscosity of PAS was increased within a range of the present invention. In each of the examples, the impact resistance of the pipe was more preferred as compared with Example 5. In Example 8, the thermal oxidation treatment was applied after applying the acetic acid treatment to PAS(A). It was found that the amount of Na in the pipe could be reduced by the acetic acid treatment. In Comparison Example 6, no thermal oxidation treatment was applied to PAS(A) after the acetic acid treatment and was molded as it was. The impact resistance was poor as compared with example 8. In Example 9, the time for the thermal oxidation treatment was increased as compared with Example 8. The impact resistance of the pipe was increased as compared with Example 8. In Comparison Example 7, cooling for the gaseous phase part of the reactor was not applied upon production of PAS. The melt viscosity of PAS(A) was remarkably low and the pipe molding was impossible. In Comparison Example 8, PAS obtained in Comparison Example 7 was applied with the thermal oxidation treatment in which the impact resistance was remarkably lower as compared with each of the examples.

The present invention provides a tubular extrusion molding product comprising a high molecular weight polyarylene sulfide having excellent mechanical strength such as impact resistance by itself.

TABLE 1

|  | Example | | | | Comparison Example | | | |
|---|---|---|---|---|---|---|---|---|
|  | 1 | 2 | 3 | 4 | 1 | 2 | 3 | 4 |
| PAS production condition | | | | | | | | |
| Addition amount of 1,2,4-TCB (mol %) | 0.28 | 0.60 | 0.28*1 | 0.28*2 | 0 | 0.12 | 1.05 | 1.60 |
| Cooling for gaseous phases part of a rea | Y | Y | Y | Y | Y | Y | Y | N |
| Resultant PAS | | | | | | | | |
| Kind of PAS | P-1 | P-2 | P-3 | P-4 | P-C1 | P-C2 | P-C3 | P-C4 |
| Melt viscosity of PAS (poise) | 30300 | 49300 | 28400 | 45100 | 1400 | 2980 | 89000 | 45400 |
| Physical property of molding product | | | | | | | | |
| Izod impact strength (kgf. cm/cm) | 68 | 74 | 63 | 65 | —*3 | —*3 | —*3 | 33 |

*1: Example for adding 1,2,4-TCB in the course of reaction
*2: Example for using 1,3,5-TCB instead of 1,2,4-TCB
*3: No tubular molding product could be molded and measurement was impossible

TABLE 2

|  | Example | | | | | Comparison Example | | | |
|---|---|---|---|---|---|---|---|---|---|
|  | 5 | 6 | 7 | 8*1 | 9*1 | 5 | 6*1 | 7*2 | 8*2 |
| Kind of PAS | P-5 | P-6 | P-7 | P-8 | P-9 | P-O5 | P-O8 | P-CO5 | P-C5 |
| Melt viscosity of PAS (poise) | 3190 | 7340 | 33200 | 3280 | 7490 | 960 | 820 | 315 | 2890 |

TABLE 2-continued

|  | Example | | | | | Comparison Example | | | |
| --- | --- | --- | --- | --- | --- | --- | --- | --- | --- |
|  | 5 | 6 | 7 | 8*1 | 9*1 | 5 | 6*1 | 7*2 | 8*2 |
| Physical property of molding product | | | | | | | | | |
| Izod impact strength (kgf. cm/cm) | 39 | 42 | 35 | 36 | 39 | 16 | 14 | — | 9.0 |
| Na content (Weight ppm) | 800 | 800 | 800 | 200 | 200 | 800 | 200 | — | 800 |

*1: Example of applying acetic acid treatment
*2: Example of not applying cooling for gaseous phase part of a reactor

What is claimed is:

1. A method of manufacturing a tubular extrusion molding product consisting essentially of a polyarylene sulfide having a melt viscosity of from 5,000 poise to 60,000 poise, comprising:

reacting an alkali metal sulfide and a dihaloaromatic compound in the presence of an organic amide solvent in a reaction zone provided with a cooling means to form a product at least partially in a gaseous phase, cooling said gaseous phase product in said reaction zone by said cooling means during the reaction, thereby condensating at least a part of the gaseous phase product, refluxing the resultant condensate to a liquid phase in said reaction zone to produce a polyarylene sulfide, and extruding said polyarylene sulfide to form a tubular extrusion molding product consisting essentially of said polyarylene sulfide having a melt viscosity of from 5,000 to 60,000 poise.

2. The method of manufacturing a tubular extrusion molding product according to claim 1, including adding from 0.2 mol % to 1 mol % of a polyhaloaromatic compound to the alkali metal sulfide upon reacting the alkali metal sulfide and the dihaloaromatic compound in the presence of the organic amide solvent.

3. The method of manufacturing a tubular extrusion molding product according to claim 1, including reacting the alkali metal sulfide and the dihaloaromatic compound in the presence of the organic amide solvent to form a product at least partially in a gaseous phase, cooling the gaseous phase product during the reaction, condensating at least a part of said gaseous phase product to form a condensate and refluxing the resultant condensate to a liquid phase to obtain a polyarylene sulfide and then heating said polyarylene sulfide in a gaseous phase oxidative atmosphere.

4. The method of manufacturing a tubular extrusion molding product according to claim 3, including an acid treatment with an acid solution at a concentration of from 0.01% by weight to 5% by weight at a temperature of not higher than 100° C. before heating said polyarylene sulfide in the gaseous phase oxidative atmosphere.

5. The method of manufacturing a tubular extrusion molding product according to claim 2, including reacting the alkali metal sulfide and the dihaloaromatic compound in the presence of the organic amide solvent to form a product at least partially in a gaseous phase, cooling the gaseous phase product during the reaction, condensating at least a part of said gaseous phase product to form a condensate, and refluxing the resultant condensate to a liquid phase to obtain a polyarylene sulfide and then heating said polyarylene sulfide in a gaseous phase oxidative atmosphere.

6. The method of manufacturing a tubular extrusion molding product according to claim 5, including an acid treatment of said polyarylene sulfide with an acid solution at a concentration of from 0.01% by weight to 5% by weight at a temperature of not higher than 100° C. before heating said polyarylene sulfide in the gaseous phase oxidative atmosphere.

7. A method of manufacturing a tubular extrusion molding product consisting essentially of a polyarylene sulfide having a melt viscosity of from 20,000 poise to 50,000 poise, comprising:

reacting an alkali metal sulfide and a dihaloaromatic compound in the presence of an organic amide solvent in a reaction zone provided with a cooling means to form a product at least partially in a gaseous phase, cooling said gaseous phase product in said reaction zone by said cooling means during the reaction, thereby condensating at least a part of the gaseous phase product, refluxing the resultant condensate to a liquid phase in said reaction zone to produce a polyarylene sulfide, and extruding said sulfide to form a tubular extrusion product consisting essentially of said polyarylene sulfide having a melt viscosity of from 20,000 to 50,000 poise.

* * * * *